United States Patent [19]

Yasuda et al.

[11] 4,397,923
[45] Aug. 9, 1983

[54] METHOD OF MANUFACTURING AN OPTICAL RECORDING ELEMENT

[75] Inventors: Nobuaki Yasuda, Zushi; Yoshinori Fujimori, Kawasaki; Masaaki Morita, Yokohama, all of Japan

[73] Assignee: Tokyo Shibaura Denki Kabushiki Kaisha, Kawasaki, Japan

[21] Appl. No.: 274,196

[22] Filed: Jun. 16, 1981

Related U.S. Application Data

[62] Division of Ser. No. 171,288, Jul. 23, 1980, Pat. No. 4,343,862.

[30] Foreign Application Priority Data

Aug. 1, 1979 [JP] Japan .................................. 54-97196

[51] Int. Cl.³ ........................ B05D 5/06; B32B 27/06; G01D 15/34
[52] U.S. Cl. .................................. 427/162; 156/308.2; 346/76 L; 346/135.1; 346/137; 427/164; 427/165; 427/166; 427/250; 427/289; 427/294; 427/296; 428/421; 428/458; 428/473.5; 428/480; 428/913
[58] Field of Search ............... 428/421, 480, 458, 457, 428/461, 913, 473.5; 430/945; 427/162, 164, 165, 296, 375, 388.1; 346/76 L, 135.1; 156/60, 151, 308.2, 176

[56] References Cited

U.S. PATENT DOCUMENTS

| | | | |
|---|---|---|---|
| 3,990,084 | 11/1976 | Hamisch et al. | 430/945 X |
| 4,000,492 | 12/1976 | Willens | 430/945 X |
| 4,214,249 | 7/1980 | Kasai et al. | 430/945 X |
| 4,253,891 | 3/1981 | Brussel | 156/60 |

OTHER PUBLICATIONS

R. A. Bartolini et al. Optical Disk Systems Emerge IEEE Spectrum, Aug. 1978, pp. 20-28.

*Primary Examiner*—Thomas J. Herbert, Jr.
*Attorney, Agent, or Firm*—Oblon, Fisher, Spivak, McClelland & Maier

[57] ABSTRACT

An optical recording element which comprises a heat-resistant organic resin substrate; a recording layer formed on said substrate by thermal deposition or sputtering; and a transparent organic resin protective layer mounted on the recording layer, and wherein the organic resin substrate and organic resin protective layer are thermally fixed under pressure with the recording layer laid between them.

4 Claims, 5 Drawing Figures

METHOD OF MANUFACTURING AN OPTICAL RECORDING ELEMENT

This is a division, of application Ser. No. 171,288 filed July 23, 1980 now U.S. Pat. No. 4,343,862.

BACKGROUND OF THE INVENTION

1. Field of the Invention

This invention relates to an optical recording element for recording and retrieving information by irradiating, for example, laser beams, and a method of manufacturing the same.

2. Description of the Prior Art

The known high density optical recording system comprises radiating laser beams whose diameter is narrowed to less than 1 micron on a thin recording layer to produce pits therein or change the structure of said thin recording layer for the recording of information; irradiating laser beams on the thin layer in which information is recorded and retrieving information according to the percentage reflection of laser beams from said thin layer or the percentage permeation of laser beams through said thin layer.

FIGS. 1A and 1B show the conventional optical recording element used with the above-mentioned optical recording system. FIG. 1A is a front view of said optical recording element, and FIG. 1B is a cross sectional view thereof. A disk-shaped optical recording element (hereinafter referred to as "a disk") 1 is provided at the center with a hole 2 for a spindle by which the disk is rotated. The disk 1 is formed by mounting a thin recording layer 5 on a glass substrate 4 by means of, for example, thermal deposition. A tremendous number of pits 3 are formed in a vertical pattern at a smaller pitch than 2 microns. Where information is recorded by forming pits 3 on the surface of the recording layer 5, then said layer 5 should preferably be prepared from a metal or noncrystalline material which melts at a temperature of 400° to 500° C. and evaporates at a lower temperature than 2,000° C. Where information is recorded by the structural change of the recording layer 5, then said recording layer 5 should preferably be formed of a vitric semiconductor material. A protective layer 7 is fixedly mounted on the recording layer 5 by means of an adhesive 6 to prevent dust from being deposited on the recording layer 5 and saving said layer 5 from damage during handling.

However, the conventional optical recording element constructed as described above is accompanied with such various problems or drawbacks as are described below. The first problem is that at the time of recording, heat energy escapes. Where laser beams are irradiated on the recording layer 5 through the protective layer 7 to record information in the optical recording element 1, then heat generated in the recording layer 5 partly escapes to the glass substrate 4. Therefore, heat energy required for recording is lost by the amount which has thus escaped. Power has to be applied in a sufficient amount to make up for lost heat energy in order to fully carry out the formation of pits on the surface of the recording layer 5 or the structural change thereof. This requirement unavoidably leads to an increase in the size and cost of an optical recording system.

The second problem is that where information is recorded on the surface of the recording layer 5, then difficulties arise from the evaporation of the atoms of the material constituting said recording layer 5, which adversely affects the formation of pits 3, making it difficult to produce pits 3 in the desired distinct form.

The third problem is that the adhesive 6 exerts a harmful effect. That is, said adhesive 6 chemically reacts with the material of the recording layer 5 or protective layer 7, or bubbles and dust particles included in the adhesive 6 produce an objectionable effect on the recording and retrieval of data.

The fourth problem is that the disk is produced at a low efficiency. The recent trend goes toward the enlargement of the capacity of the optical recording element 1. Therefore, said element 1 is desired to be increased as much as possible in capacity. At present, a glass substrate having a diameter of 300 to 400 mm is generally used. It seems advisable to form optical recording disks having such a large diameter as 400 mm by placing two or three glass disks separately in a large evacuation apparatus and thermally deposit a recording layer on said glass disks after the evacuation is completed. However, this process which can produce only a few disks in 3 to 4 hours is far from being adapted for the quantity production of said disks. A memory device generally requires 1,000 to 2,000 optical recording disks. Therefore, the disk is demanded to have such a structure and be prepared from such a material as can reliably allow for tonnage production of an entirely different level from that which has been attained by the conventional technique. Further requirements are that the disk should be commercially available at a low cost, and a tremendous number of pits having a smaller diameter than 1 micron have to be formed all over the surface of a disk having a diameter of 400 mm.

A lens used to narrow the diameter of, for example, laser beams to 1 micron has to be operated over an extremely short range of distance as less than 1.5 mm. Further, rigid limitations are imposed on the flatness precision of the surface of the glass substrate 4, because the focal point of the above-mentioned lens has to be always set on the recording layer 5. With the conventional optical recording element 1, therefore, the surface of said glass substrate 4 should be polished with as high precision as possible.

SUMMARY OF THE INVENTION

It is accordingly an object of this invention to provide an optical recording element having such an entirely novel structure as dispenses with the application of any adhesive.

Another object of the invention is to provide a method of manufacturing an optical recording element which is prominently adapted for quantity production.

To attain the first mentioned object, this invention provides an optical recording element which comprises a heat-resistant organic resin substrate, a recording layer deposited on said substrate, and a transparent organic resin protective layer mounted on said recording layer.

An optical recording element of this invention can be manufactured by forming a recording layer on a heat-resistant organic resin substrate and thermally depositing a transparent organic resin protective layer on said recording layer with pressure.

This invention has the advantage of producing with high productivity a new type of optical recording element having such a novel structure as can resolve problems accompanying the conventional optical recording element.

BRIEF DESCRIPTION OF THE DRAWINGS

This invention can be more fully understood from the following detailed description when taken in conjunction with the accompanying drawings, in which.

DESCRIPTION OF THE PREFERRED EMBODIMENTS

Figure 1A:
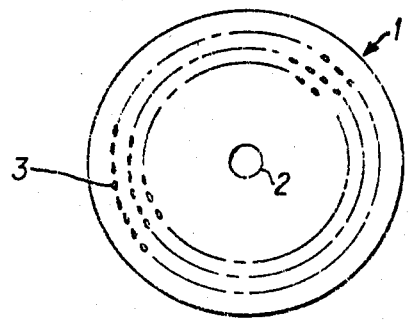
FIG. 1A is a front view of the conventional optical recording element.
Figure 1B:
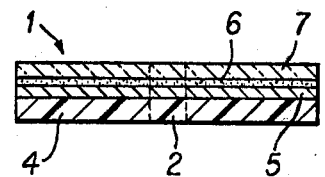
FIG. 1B is a cross sectional view of the conventional optical recording element.
Figure 2:
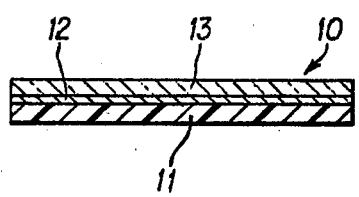
FIG. 2 is a cross sectional view of an optical recording element according to one embodiment of this invention.
Figure 3:
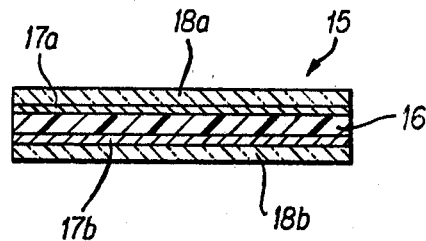
FIG. 3 is a cross sectional view of an optical recording element according to another embodiment of the invention.

Referring to FIG. 2, an optical recording element 10 comprises a recording layer 12 mounted on a heat-resistant organic resin substrate 11 by the conventional process such as thermal deposition or sputtering, and a transparent organic resin protective layer 13 thermally deposited under pressure on said recording layer 12. FIG. 3 illustrates an optical recording element according to another embodiment of this invention, in which a recording layer is deposited on both sides of a substrate. Referring to FIG. 3, an optical recording element 15 comprises recording layers 17a, 17b deposited on both sides of a heat-resistant organic resin substrate 16 by the conventional process. The recording layers 17a, 17b are respectively covered with transparent organic resin protective layers 18a, 18b. With the optical recording elements 10, 15 of FIGS. 2 and 3, the recording and retrieval of information by means of, for example, laser beams are carried out through the respective transparent organic resin protective layers 13 and 18a–18b.

An organic resin constituting the substrate of the optical recording element well serves the purpose, if it is of such type as meets requirements for a long effective life, and withstanding the heat applied in thermal deposition under pressure.

The preferred types of said organic resin concretely include polyimide resins and fluorine-contained resins such as Teflon (manufactured by E. I. du Pont de Nemours & Co., Inc.). The substrate is chosen to have a thickness generally ranging from 100 to 500 microns, through said thickness varies with the type of resin used.

An organic resin constituting a protective layer well serves the purpose, if it is transparent and imperious to, for example, laser beams applied in the recording and retrieval of information and has a softening point known higher than that of the heat-resistant organic resin constituting the substrate. The preferred types of organic resin constituting a protective layer concretely include polyester resins such as Mylar (manufactured by E. I. du Pont de Nemours & Co., Inc.) and fluorine-contained resins such as Teflon. The protective layer is chosen to have a thickness generally ranging from 50 to 300 microns. The recording layer may be formed of a thin film prepared from a material generally applied in recording information. It is, however, preferred to use such a thin film as allows for the easy control of thickness and has a high structural uniformity, for example, a film wholly or mainly consisting of tellurium.

Figure 4:
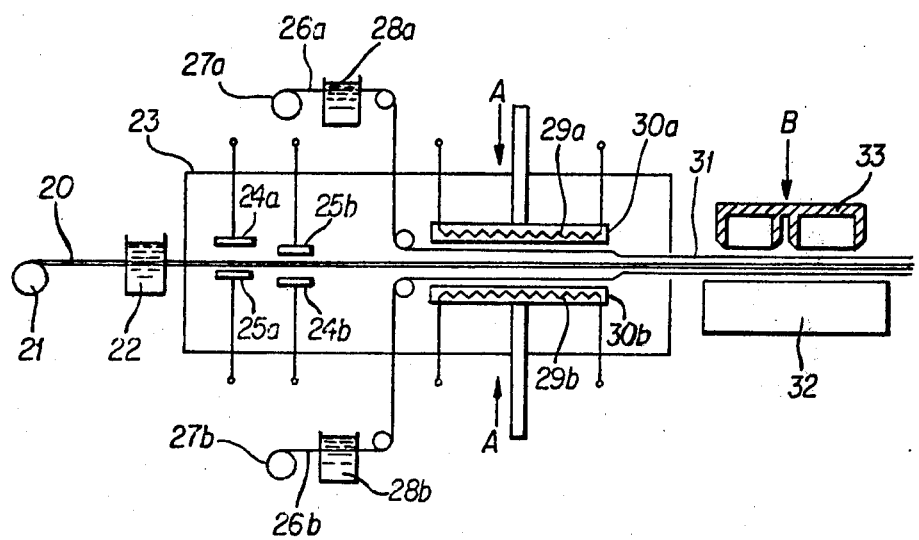
FIG. 4 is a schematic longitudinal sectional view of an apparatus for manufacturing an optical recording element of this invention.

Description is now given with reference to FIG. 4 of a method of manufacturing an optical recording element according to this invention. A heat-resistant organic resin sheet 20 to be used as a substrate is continuously drawn out by means of a feed roll at a prescribe speed. Both sides of said substrate sheet 20 are washed by a washing device 22. It is preferred that after properly dried, both sides of the washed substrate sheet 20 be later activated, for example, by applying an electric field thereon. Thereafter, the substrate sheet 20 is taken into a vacuum chamber 23, and conducted through a region defined between a target 24a and earth electrode 25a and also the adjacent region defined between a target 24b and earth electrode 25b. The targets 24a, 24b are respectively formed of a metal or non-crystalline material which is sputtered to constitute a recording layer. A high frequency electric field is applied to the region defined between the target 24a and earth electrode 25a and also to the region defined between the target 24b and earth electrode 25b. An inert gas, for example nitrogen, is let to pass through the vacuum chamber 23 at a prescribed flow rate. As a result, discharge takes place between the target 24a and earth electrode 25a, as well as between the target 24b and earth electrode 25b. Therefore, the target material is sputtered on both sides of the organic resin substrate sheet 20 to provide the recording layers 17a, 17b of FIG. 3. The thickness of these recording layers 17a, 17b is defined by an amount of electric energy irradiated on the targets 24a, 24b and the speed at which the substrate sheet is made to run. Further, it is possible to set a sputter etching target in front of the targets 24a, 24b in order to increase the adhesivity of the sputtered recording layers 17a, 17b to the organic resin substrate sheet 20.

After the introduction of the organic resin substrate sheet 20, transparent organic resin protective sheets 26a, 26b having a softening point lower than or substantially the same as that of the organic resin substrate sheet 20 are respectively supplied from feed rolls 27a, 27b into the vacuum chamber 23 through the corresponding washing devices 28a, 28b. At this time, both sides of the heat-resistant organic resin substrate sheet 20 already coated with the recording layers 17a, 17b are made to be clamped between said transparent organic resin protective sheets 26a, 26b. Thereafter, the organic resin substrate sheet 20, both sides of which are already coated with the recording layers 17a, 17b and the transparent organic resin protective sheets 26a, 26b are conducted through a region defined between pressurizing boards 30a, 30b respectively containing heaters 29a, 29b. Where the above-mentioned laminated sheet mass is brought to a prescribed position, then pressure is applied on the pressurizing boards 30a, 30b in the directions as indicated by the arrows A. As a result, the transparent organic resin protective sheets 26a, 26b are pressed against the surfaces of the recording layers 17a, 17b mounted on both sides of the organic resin substrate sheet 20 in the sandwiched form, so to speak. The respective components of the entire sheet mass 31 are thermally pressed together to provide a great mechanical strength. The laminated sheet mass 31 is taken out of the vacuum chamber 23 to be placed on a stool 32. A cutter 33 set above the sheet mass 31 is operated in the direction of the indicated arrow B to cut said sheet 31 into the disk form.

The foregoing description with reference to FIG. 4 referred to the method of manufacturing an optical recording element by thermally depositing a recording layer on both sides of the organic resin substrate 16 of FIG. 3. Where, however, an optical recording element is formed by thermally depositing an organic resin recording layer on one side of the organic resin substrate 11 of FIG. 2, then it is advised to provide only one target, for example, 24a and only one earth electrode, for example, 25a and supply only one transparent organic resin protective sheet, for example, 26a.

This invention will be more fully understood with reference to the following example.

EXAMPLE

A disk-shaped optical recording element was manufactured with a recording layer deposited on one side of the substrate of said disk by applying the manufacturing apparatus of FIG. 4.

A Teflon sheet having a thickness of 200 microns was continuously drawn out by means of a feed roll to be used as a substrate and thereafter washed. Tellurium was sputtered on the properly desired Teflon sheet in a vacuum chamber to form a recording layer with a thickness of 500 Å. Thereafter, a Teflon sheet having a thickness of 80 microns was thermally pressed for 10 minutes as a protective layer against the surface of the recording layer by a pressurizing board at a temperature of 260° C. and a pressure of 2 kg/cm$^2$. The thermally laminated sheet mass was cut into the disk form. Thus, a disk having a diameter of 400 mm in which a recording layer prepared from tellurium was sandwiched between the Teflon substrate and Teflon protective layer, was manufactured at the rate of one piece per minute.

An optical recording element embodying this invention has the following advantages.

First, a recording layer is sandwiched between two organic resin sheets having a low heat conductivity. Where, therefore, information is recorded by irradiating, for example, laser beams on the recording layer, then heat energy is little likely to escape from the recording layer, enabling information to be recorded with a small power consumption.

Secondly, where pits are formed on the surface of a recording layer by partly evaporating said layer, for example, by laser energy, as in the case of a tellurium recording layer, then the evaporated atoms of the material constituting said recording layer are diffused, dispersed and absorbed in the organic resin layers formed adjacent to said tellurium recording layer due to the original polarity of said organic resin layers, instead of settling in the pits. Therefore, distinctly defined pits can always be formed with low energy consumption.

Thirdly, the substrate and protective layer are prepared from, for example, Teflon which has excellent heat resistance and moisture-proofness and whose property is little subject to change with time. Therefore, an optical recording element embodying this invention can be effectively applied over a long period of at least 10 to 15 years.

The method of this invention for manufacturing an optical recording element has the following advantages.

First, a transparent organic resin protective layer can be deposited on the recording layer in a pinhole-free state, thereby elevating the precision with which information is recorded and retrieved.

Secondly, the protective layer is thermally pressed against the recording layer without using an adhesive at all. Therefore, the recording layer is completely saved from its chemical reaction with an adhesive and also from mechanical stresses resulting from the adhesive. Consequently, the optical recording element of this invention allows for the uniform recording and retrieval of information and can be used over a long period of time.

Thirdly, the method of this invention enables a thermally laminated sheet of optical recording element having a width of 500 mm to be produced at a speed of 100 to 500 mm per minute. In other words, one disk-shaped optical recording element having a diameter of 300 to 400 mm can be manufactured in several minutes. Therefore, the optical recording element of the invention can be manufactured in a number 10 to 20 times larger than the conventional optical recording element whose substrate is formed of glass, as compared on the basis of the same size, thereby prominently contributing to the quantity production of an optical recording element.

What we claim is:

1. A method of manufacturing an optical recording element, which comprises the steps of:
   preparing a heat-resistant organic resin substrate sheet;
   taking said substrate sheet into a vacuum chamber;
   forming a recording layer on said substrate sheet by sputtering in said vacuum chamber;
   preparing a transparent organic resin protective sheet having a softening point less than or equal to the softening point of said heat-resistant organic resin substrate sheet;
   taking said protective sheet into said vacuum chamber;
   thermally pressing said protective sheet against said recording layer in said vacuum chamber to form a thermally laminated sheet mass;
   taking said thermally laminated sheet mass out of said vacuum chamber; and
   cutting said thermally laminated sheet mass into a prescribed form.

2. The method according to claim 1, wherein said heat-resistant organic resin substrate sheet is prepared from one of polyimide resins and fluorine-contained resins.

3. The method according to claim 1, wherein said recording layer is prepared wholly or mainly from tellurium.

4. The method according to claim 1, wherein said transparent organic resin protective sheet is prepared from one of polyester resins and fluorine-contained resins.

* * * * *